United States Patent
Blaustein et al.

(10) Patent No.: US 11,648,485 B2
(45) Date of Patent: May 16, 2023

(54) TOY ROBOT

(71) Applicant: Learning Resources, Inc., Vernon Hills, IL (US)

(72) Inventors: Michael Blaustein, Chicago, IL (US); Elizabeth M. Ganrude, Arlington Heighls, IL (US); Barbara Ellen Plain, Winnetka, IL (US)

(73) Assignee: Learning Resources, Inc., Vernon Hills, IL (US)

( * ) Notice: Subject to any disclaimer, the term of this patent is extended or adjusted under 35 U.S.C. 154(b) by 340 days.

(21) Appl. No.: 16/954,476

(22) PCT Filed: Dec. 18, 2018

(86) PCT No.: PCT/US2018/066325
§ 371 (c)(1),
(2) Date: Jun. 16, 2020

(87) PCT Pub. No.: WO2019/126234
PCT Pub. Date: Jun. 27, 2019

(65) Prior Publication Data
US 2021/0077915 A1 Mar. 18, 2021

Related U.S. Application Data

(60) Provisional application No. 62/607,839, filed on Dec. 19, 2017.

(51) Int. Cl.
*A63H 30/04* (2006.01)
*G09B 1/32* (2006.01)
(Continued)

(52) U.S. Cl.
CPC ........... *A63H 17/395* (2013.01); *A63H 30/04* (2013.01); *G09B 1/325* (2013.01); *G09B 19/0053* (2013.01); *A63H 2200/00* (2013.01)

(58) Field of Classification Search
CPC .... A63H 30/04; A63H 2200/00; G09B 1/325; G09B 19/0053
See application file for complete search history.

(56) References Cited

U.S. PATENT DOCUMENTS

D287,986 S    1/1987  Matsui
D307,305 S    4/1990  Horiuchi
(Continued)

OTHER PUBLICATIONS

Makeblock mBot: Entry-level coding robot kit for kids, https://www.makeblock.com/steam-kits/mbot (Year: 2022).*
(Continued)

*Primary Examiner* — Jay Trent Liddle
*Assistant Examiner* — Alyssa N Brandley
(74) *Attorney, Agent, or Firm* — Michael Best & Friedrich LLP

(57) ABSTRACT

A programmable robot includes a body, a pair of drive wheels rotatably coupled to the body, a pair of electric motors in the body for driving the drive wheels, a receiver unit configured to receive at least one wireless command from a programming device, a sensor configured to sense a surrounding environment of the programmable robot, and a controller operably connected to the receiver unit and the sensor, the controller configured to control operation of the electric motors in response to the at least one wireless command received from the receiver unit and a data signal received from the sensor.

20 Claims, 12 Drawing Sheets

(51) Int. Cl.
  *G09B 19/00* (2006.01)
  *A63H 17/395* (2006.01)

(56) References Cited

U.S. PATENT DOCUMENTS

| | | | |
|---|---|---|---|
| D463,834 S | 10/2002 | Hornsby et al. | |
| D464,090 S | 10/2002 | Hornsby et al. | |
| D464,382 S | 10/2002 | Hornsby et al. | |
| D471,243 S | 3/2003 | Cioffi et al. | |
| 7,291,054 B2* | 11/2007 | Choi | A63H 17/262 |
| | | | 446/454 |
| D609,287 S | 2/2010 | Kinzer | |
| 8,587,715 B2 | 11/2013 | Takeda | |
| D711,451 S | 8/2014 | Katsuyama | |
| D769,345 S | 10/2016 | Hinkel | |
| D852,286 S | 6/2019 | Chen | |
| D857,117 S | 8/2019 | Venancio et al. | |
| 2005/0049750 A1 | 3/2005 | Parker et al. | |
| 2008/0133052 A1 | 6/2008 | Jones et al. | |
| 2010/0123819 A1 | 5/2010 | Yu | |
| 2013/0335568 A1 | 12/2013 | Tang | |
| 2015/0073598 A1 | 3/2015 | Rosenstein et al. | |
| 2015/0364060 A1* | 12/2015 | Gupta | B25J 9/0081 |
| | | | 434/118 |
| 2016/0350589 A1 | 12/2016 | Chiu | |
| 2017/0106738 A1 | 4/2017 | Gillett | |
| 2017/0217021 A1 | 8/2017 | Hoffman et al. | |
| 2017/0329333 A1* | 11/2017 | Passot | G05D 1/0272 |
| 2019/0227775 A1* | 7/2019 | Kim | G06F 3/017 |

OTHER PUBLICATIONS

Botley The Coding Robot Review: Published Feb. 15, 2018 [online], site visited Mar. 11, 2020. Available from Internet URL: https://youtu.be/ghE4liv7_o0 (Year: 2018).
Makeblock mBot Robot Kit: Published May 26, 2015 [online], site visited Mar. 11, 2020. Available from Internet URL: https://www.amazon.com/dp/B00SK5RUQY/ref=cm_sw_r_tw_dp_U_x_NewAEb99WHV1K (Year: 2015).
Arduino Obstacle Avoidance Robot Car: Published Jul. 1, 2013 [online], site visited Mar. 11, 2020. Available from Internet URL: https://youtu.be/f8ZBd4TpMBg (Year: 2013).
International Search Report and Written Opinion for Application No. PCT/US2018/066325 dated Mar. 5, 2019 (13 pages).
International Preliminary Report on Patentability for Application No. PCT/US2018/066325 dated Jul. 2, 2020 (9 pages).
Terrapin, "Bee-Bot," <https://www.terrapinlogo.com/beebot.html> A version of this product was available as early as Aug. 2017. Webpage visited on Jan. 2020.
Learning Resources, "Code & Go Robot Mouse Activity Set," <https://www.learningresources.com/code-gor-robot-mouse-activity-set> A version of this product was available as early as Aug. 2017. Webpage visited on Jan. 2020.
Learning Resources, "Code & Go Robot Mouse," <https://www.learningresources.com/stem-robot-mouse> A version of this product was available as early as Aug. 2017 Webpage visited on Jan. 2020.
Fisher-Price, "Fisher-Price Think & Learn Code-a-PillarToy," <https://www.fisher-price.com/en-us/product/think-learn-code-a-pillar-twist-gfp25> A version of this product was available as early as Aug. 2017. Webpage visited on Jan. 2020.
Primo Toys, "Cubetto," <https://www.primotoys.com/shop/cubetto-playset/> A version of this product was available as early as Aug. 2017. Webpage visited on Jul. 13, 2020.
Sphero, "Sphero SPRK+," <https://www.sphero.com/sphero-sprk-plus> A version of this product was available as early as Aug. 2017. Webpage visited on Jan. 2020.
Wonder Workshop, "WonderWorkshop Dash," <https://www.makewonder.com/> A version of this product was available as early as Aug. 2017. Webpage visited on Jan. 2020.
Makeblock, "mBot Entry-level educational robot kit," <https://www.makeblock.com/steam-kits/mbot> A version of this product was available as early as Aug. 2017. Webpage visited on Jan. 2020.
Wowee, "Coder Mip," <https://wowwee.com/coder-mip> A version of this product was available as early as Aug. 2017. Webpage visited on Jan. 2020.
Lego, "BOOST Creative Toolbox," <https://www.lego.com/en-us/product/boost-creative-toolbox-17101> A version of this product was available as early as Aug. 2017. Webpage visited on Jan. 2020.
Ozobot, "Brt Coding Robot (White)," <https://www.amazon.com/Ozobot-OZ-BIT-S-WHITE-Coding-Robot-White/dp/B01M97P47H/ref=asc_df_B01M97P47H/?tag-hyprod-20&linkCode=df0&hvadid=312126292928&hvpos=1o2&hvnetw=g&hvrand=15384752268504280452&hvpone=&hvptwo=&hvqmt=&hvdev=c&hvdvcmdl=&hvlocint=&hvlocphy=9021571&hvtargid=aud-801381245258:pla-348218201230&psc=1> A version of this product was available as early as Aug. 2017. Webpage visited on Jan. 2020.
Ozobot, "Evo," <https://shop.ozobot.com/products/evo> A version of this product was available as early as Aug. 2017. Webpage visited on Jan. 2020.
Osmo, "Coding Awbie," <https://www.playosmo.com/en/coding/> A version of this product was available as early as Aug. 2017. Webpage visited on Jan. 2020.
Kano, "Pixel Kit," <https://kano.me/us/store/products/pixel-kit> A version of this product was available as early as Aug. 2017. Webpage visited on Jan. 2020.
Bloxels, "Game Studio Pack," <https://store.bloxelsbuilder.com/> A version of this product was available as early as Aug. 2017. Webpage visited on Jan. 2020.

\* cited by examiner

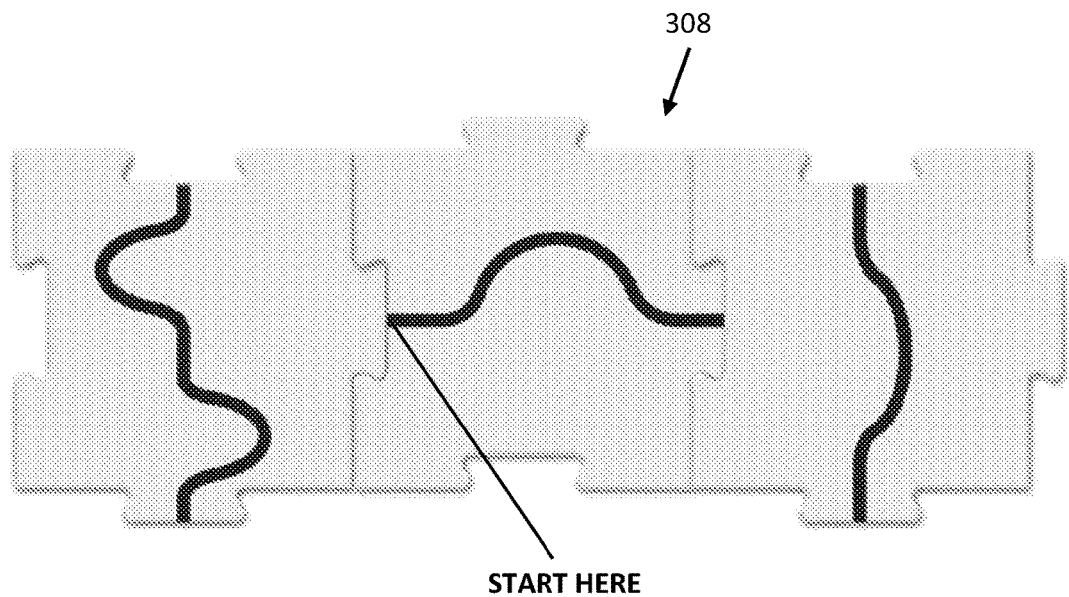
START HERE
FIG. 13
1. Basic Commands    410
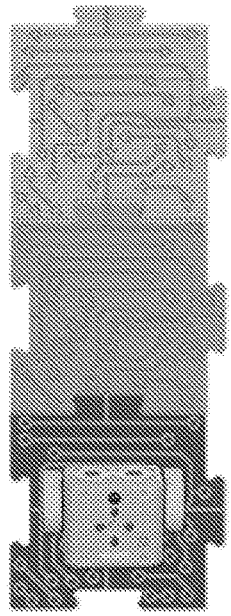
Start on the BLUE board. Program Botley to get to the GREEN board.
2. Introducing Turns    420
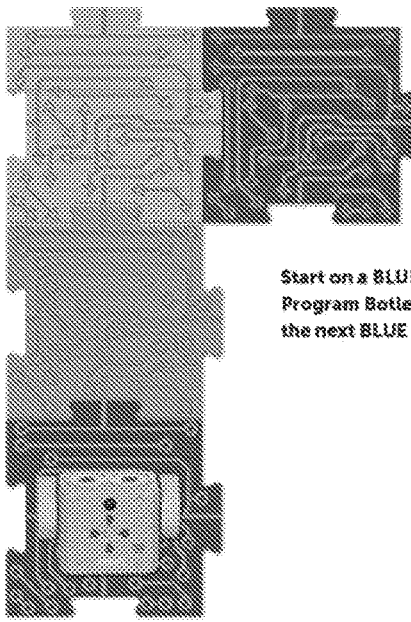
Start on a BLUE board. Program Botley to get to the next BLUE board.
FIG. 14

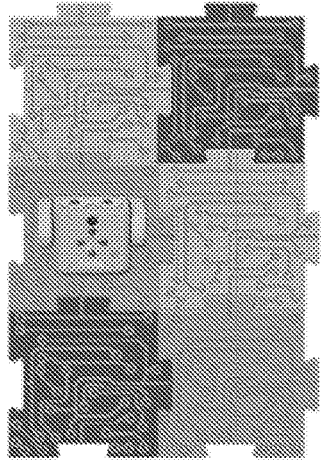
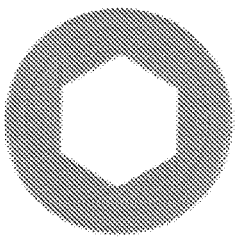
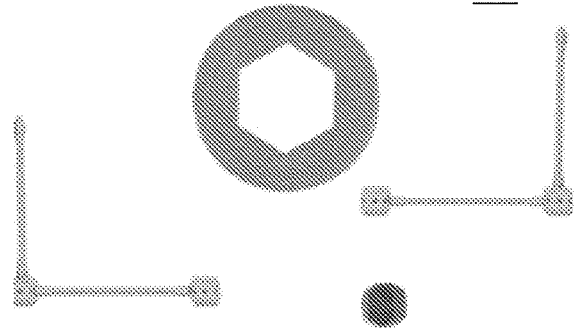
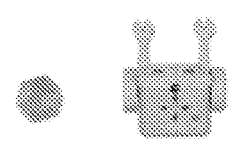
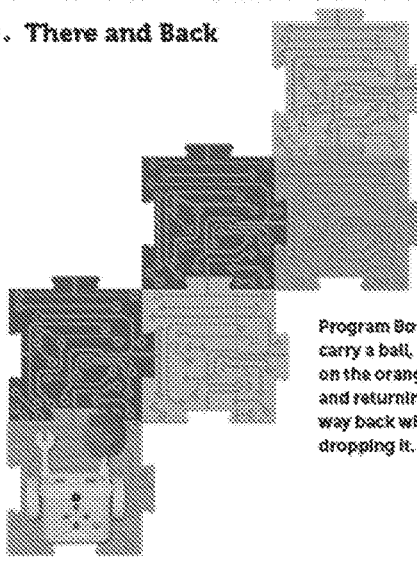
FIG. 15

7. If/Then/Else 470

Program Botley to move forward 3 steps to get to the orange board. Then, use Object Detection to go around the blocks.

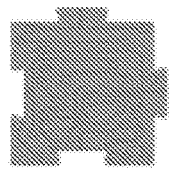

8. Nowhere to Run 480

Using Object Detection, program Botley to keep turning around between the objects.

9. Make a Square 490

Using the LOOP command, program Botley to move in a square pattern.

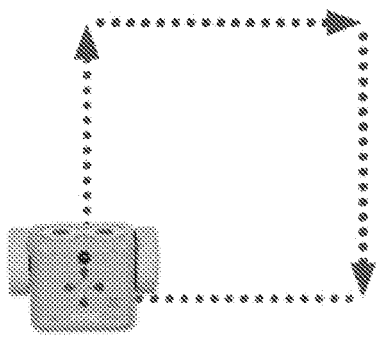

10. Combo Challenge 500

Using both LOOP and Object Detection, program Botley to move from the blue board to the green board.

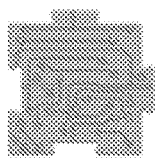

FIG. 16

TOY ROBOT

CROSS-REFERENCE TO RELATED APPLICATIONS

This application claims priority to U.S. Provisional Patent Application No. 62/607,839, on Dec. 19, 2017, the contents of which is hereby incorporated by reference in their entirety.

BACKGROUND

The present disclosure relates to a toy robot and, more specifically, a programmable toy robot using a remote handheld programming device. Other aspects of the present disclosure will become apparent by consideration of the detailed description and accompanying drawings.

BACKGROUND

In some embodiments, a programmable robot includes a body, a pair of drive wheels rotatably coupled to the body, a pair of electric motors in the body for driving the drive wheels, a receiver unit configured to receive at least one wireless command from a programming device, a sensor configured to sense a surrounding environment of the programmable robot, and a controller operably connected to the receiver unit and the sensor, the controller configured to control operation of the electric motors in response to the at least one wireless command received from the receiver unit and a data signal received from the sensor.

In some embodiments, a method of teaching and learning computer programming using a programmable robot is provided. The programmable robot has a sensor for detecting an object relative to the programmable robot and is configured to be programmed remotely to move along a predetermined path using a handheld button-based programming device. The remote handheld programming device includes at least one maneuvering button for generating a move instruction to control movement of the programmable robot, an object detection button for generating a conditional instruction block to control movement of the programmable robot in response to detecting the object, and a transmit button for transmitting the move instruction and the conditional instruction block to the programmable robot. The method includes actuating the at least one maneuvering button of the handheld button-based programming device and repeating the step one or more times to generate a main sequence of move instructions for the programmable robot; actuating the object detection button of the handheld button-based programming device to generate a conditional instruction block for the programmable robot; actuating the at least one maneuvering button of the handheld button-based programming device directly after selecting the object detection button and repeating the step one or more times to generate an alternate sequence of move instructions for the programmable robot as part of the conditional instruction block; and actuating the transmit button of the handheld button-based programming device to transmit to the programmable robot i) the main sequence of move instructions for controlling the programmable robot to perform the main sequence of move instructions and ii) the conditional instruction block including the alternate sequence of move instructions for controlling the programmable robot to perform the alternate sequence of move instructions in response to detecting the object.

BRIEF DESCRIPTION OF THE DRAWINGS

FIG. 13 shows an arrangement of boards having a printed black line for use the programmable toy robot of FIG. 1;

FIGS. 14-16 show examples of coding challenges for use the programmable toy robot of FIG. 1;

DETAILED DESCRIPTION

Before any embodiments of the present disclosure are explained in detail, it is to be understood that the present disclosure is not limited in its application to the details of construction and the arrangement of components set forth in the following description or illustrated in the following drawings. The present disclosure is capable of other embodiments and of being practiced or of being carried out in various ways.

Figure 8:
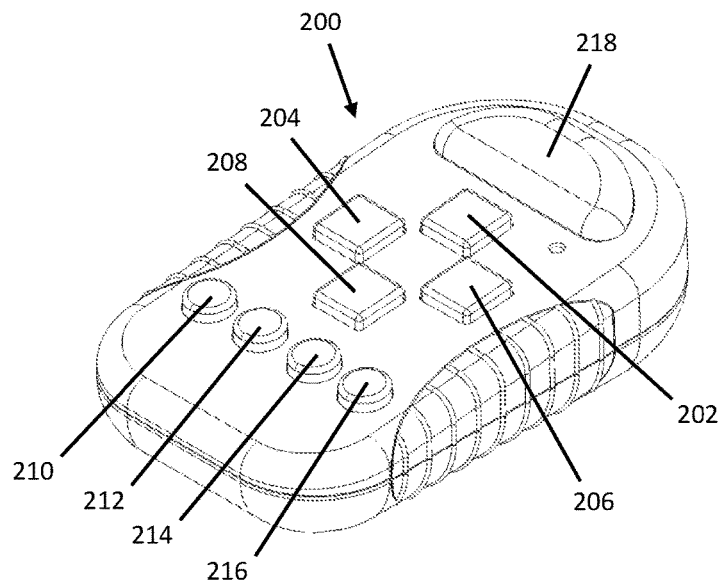
FIG. 8 shows an embodiment of a remote handheld programming device for use with the programmable toy robot of FIG. 1.

Referring now to the figures, FIGS. 1-7 and 18 illustrate an embodiment of a programmable toy robot (or programmable robot) 100 and FIG. 8 illustrates an embodiment of a remote handheld programming device (or programming device) 200 for use with the programmable robot 100.

In the illustrated embodiment, the programmable robot 100 includes a box-shaped body 102 and a drive assembly having a pair of drive wheels 104 driven by a pair of electric motors 130*a* and 130*b*. The body 102 has two opposing lateral sides, a top side opposite a bottom side, the top and bottom sides being arranged between the opposing lateral sides, and a front side opposite a rear side, the front side and the rear side being arranged between the opposing lateral sides and the front and rear sides. The drive wheels 104 are mounted on opposite sides of the robot body 102 to rotate on a common axis. In some embodiments, the diameter of the drive wheels may be approximately the same as the height of the lateral sides of the body 102. The electric motors 130a and 130b are housed in the body 102. The drive wheels 104 and the electric motors 130a and 130b may form part of a differential steering system where each drive wheel 104 is separately driven by one of the electric motors 130a and 130b. This allows the programmable robot 100 to move forward or backward in a straight line by driving both drive wheels 104 in the same direction and speed and to change direction by varying the relative rate of rotation of the drive wheels. Further, a third non-driven wheel 116, for example, an unpowered ball wheel, is mounted along the bottom side of the body 102 to help balance the robot 100.

The programmable robot 100 also includes a controller 120 operably connected to the electric motors 130a and 130b to independently control the rate and direction of rotation of each drive wheel 104. In addition, the controller 120 is operably connected to a receiver unit 122, an objection detection sensor 110 (for example, an LED-based sensor, an infrared (IR) sensor, or an ultrasonic sensor) and a black line sensor 112 (for example, a color sensor or an infrared (IR) sensor). The receiver 122 unit is configured to receive wireless commands from the remote programming device 200 and to transmit those commands to the controller 120. The receiver unit 122 can also be a transceiver capable of receiving wireless signals from and transmitting wireless signals to the remote programming device 200. The controller 120 is configured to control operation of the drive assembly of the programmable robot 100 in response to the wireless commands received by the receiver unit 122 and signals from the objection detection sensor 110 and the black line sensor 112, as described herein.

The programmable robot 100 may include a battery pack having one or more battery cells for supplying power to operate the programmable robot 100, including the electric motors 130a and 130b, the controller 120, the receiver unit 122, the OD sensor 110 and the black sensor 112. For example, the battery pack may be a disposable battery pack or a rechargeable battery pack having one or more lithium-based cells. In the illustrated embodiment, the battery pack is supported by the body 102 at its rear side.

Figure 18:
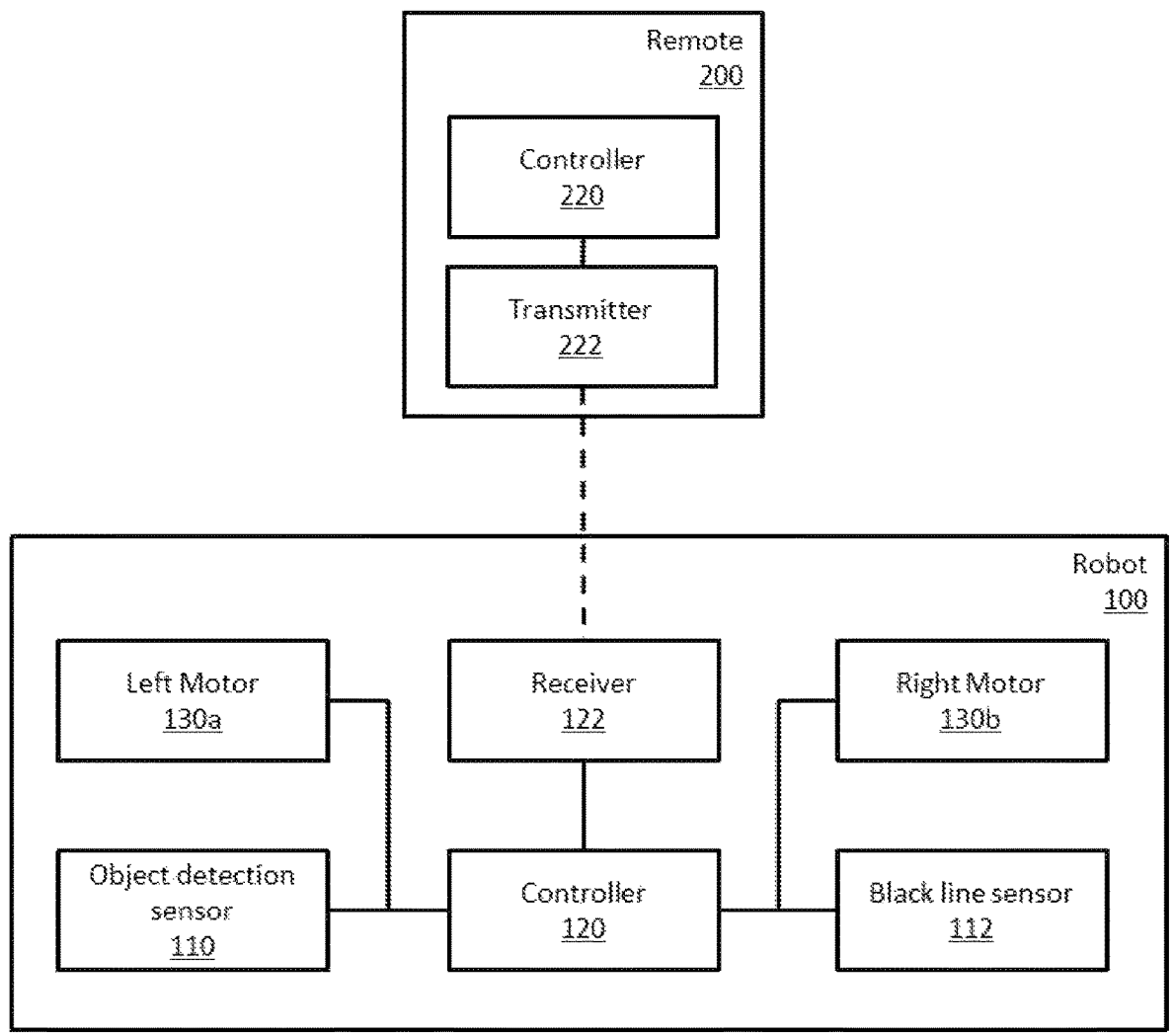
FIG. 18 is a schematic diagram of the programmable toy robot of FIG. 1 in communication with the remote handheld programming device of FIG. 8.

In the illustrated embodiment, the remote programming device 200 includes a controller 220 operably connected to a transmitter unit 222. The controller 220 is configured to generate one or more commands in response to a user input received via user interaction with the remote programming device 200, as described herein. The transmitter unit 222 is configured to transmit wirelessly the commands generated by the controller 220 to the programmable robot 100. The transmitter unit 222 can also be a transceiver capable of receiving wireless signals from and transmitting wireless signals to the remote programmable robot 100. The various components shown schematically in FIG. 18 are shown by way of example only, and the programmable robot 100 and the remote programming device 200 are not to be limited in scope to the components shown in FIG. 18.

Each controller 120 and 220 includes an electronic processor (for example, a microprocessor, or other electronic controller), memory, an input/output interface, and a bus. The bus connects various components of each controller 120 and 220, including the memory to the electronic processor. The memory includes read only memory (ROM), random access memory (RAM), an electrically erasable programmable read-only memory (EEPROM), other non-transitory computer-readable media, or a combination thereof. The electronic processor is configured to retrieve program instructions and data from the memory and execute, among other things, instructions to perform the methods described herein. Alternatively, or in addition to, the memory is included in the electronic processor. The input/output interface includes routines for transferring information between components within each controller 120 and 220 and other components of the programmable robot 100 or remote programming device 200, as well as components external to the programmable robot 100 or remote programming device 200. The input/output interface is configured to transmit and receive signals via wires, fiber, wirelessly, or a combination thereof. Signals may include, for example, information, data, serial data, data packets, analog signals, or a combination thereof. In alternate embodiments, each controller 120 and 220 may include fewer or additional components in configurations different from the configuration described above.

Coding is the language used to communicate with computers. When a user programs the programmable robot 100 using the included programming device 200, the user is engaging in a basic form of "coding." Beginning with the very basics of sequence programming is a great way to get started in the world of coding. As described below, learning the basics of sequence programming using the programmable robot 100 and the remote handheld programming device 200 can help teach and encourage basic coding concepts, advanced coding concepts like If/Then logic, critical thinking, spatial concepts, and collaboration and teamwork.

Figure 9:
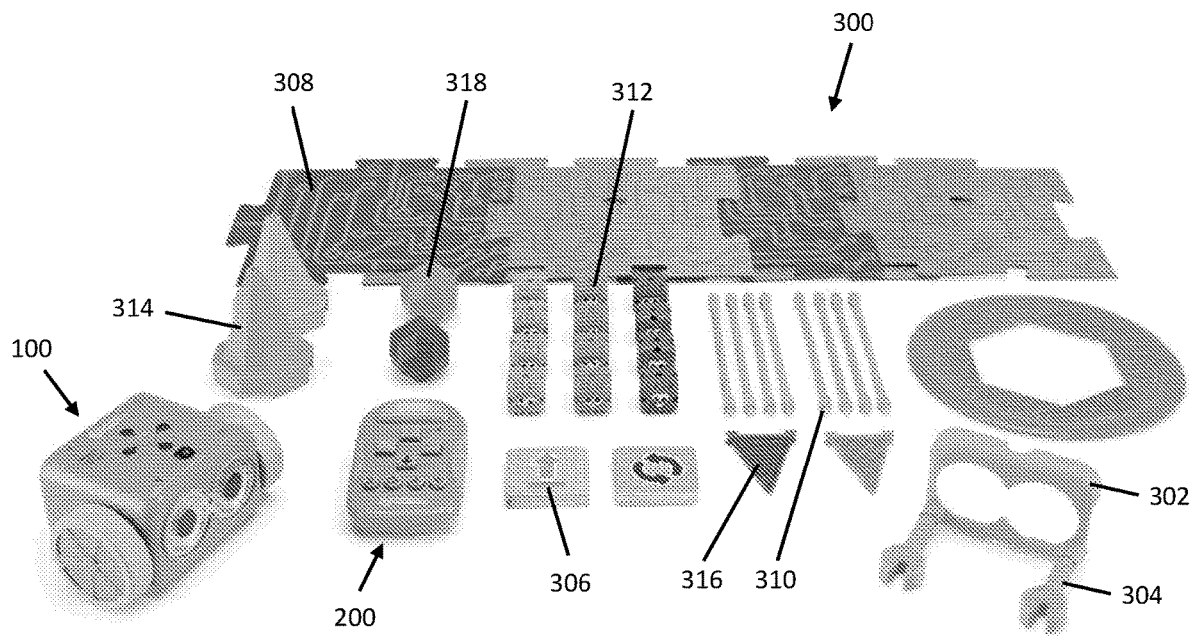
FIG. 9 shows an embodiment of a coding activity set using the programmable toy robot of FIG. 1.

With reference to FIG. 9, a coding activity set 300 using the programmable robot 100 as described in more detail below may include the programmable robot 100, the programming device 200, and one more accessories, including, for example, detachable robot 100 arms 304, coding cards 306, boards 308, sticks 310, cubes 312, cones 314, flags 316, balls 318, goals, and sticker sheets. Although an embodiment of the coding activity set 300 has been illustrated in FIG. 9, further embodiments can include fewer or more accessories. Indeed, the coding activity set 300 shown in FIG. 9 is shown by way of example only, and accessories for the programmable robot 100 are not to be limited in scope to the components shown in FIG. 19.

Getting Started

Figure 10:
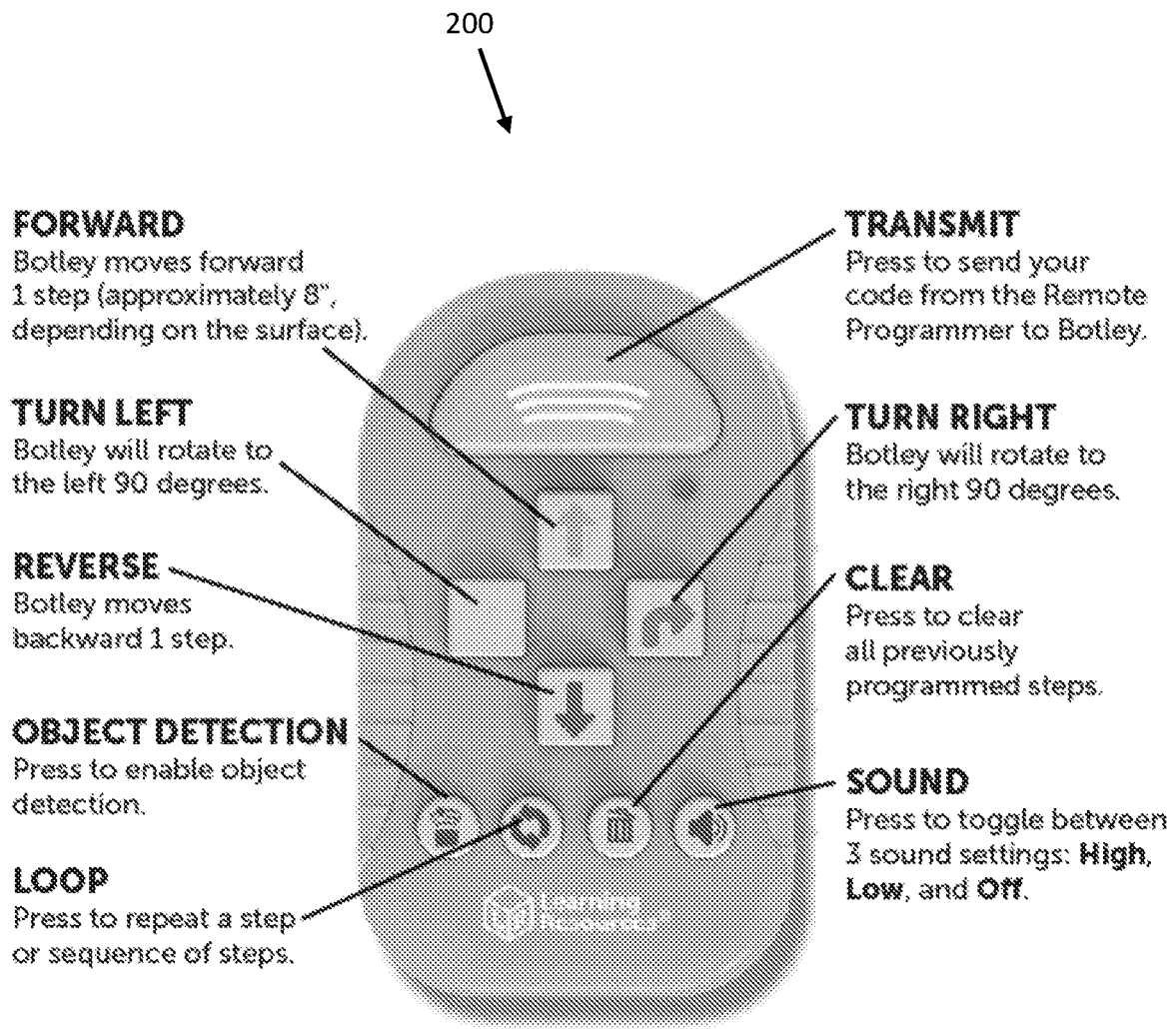
FIG. 10 shows how the remote handheld programming device of FIG. 8 can be used with the programmable toy robot of FIG. 1.

A user can program the programmable robot 100 remotely using the programming device 200 (shown in FIG. 8). Preferably, the programming device 200 includes a human-machine interface (HMI) configured with physical input hardware devices, such as buttons, a keyboard or a game pad, for coding the programmable robot 100. For example, in the illustrated embodiment, commands are entered by pressing buttons on the programming device 200, as shown in FIG. 10. As a result, a user can program the programmable robot without the use of a tablet, smartphone or other screen-based graphical user interface. In some embodiments, the programming device 200 may include a voice activated user interface that accepts verbal commands for programming the programmable robot 100. The programming device 200 can be in wireless communication with the programmable robot 100 for transmitting the commands to the programmable robot 100 using known wireless technologies, for example, Bluetooth, infrared (IR) near-field communication (NFC), radio-frequency identification (RFID), or Wi-Fi. In the illustrated embodiment, the programming device 200 includes the following buttons for programming the programmable robot 100:

FORWARD button 202: the programmable robot 100 will move forward 1 step.

TURN LEFT button 204: the programmable robot 100 will rotate to the left 90 degrees.

TURN RIGHT button 206: the programmable robot 100 will rotate to the right 90 degrees.

REVERSE button 208: the programmable robot 100 will move backward 1 step.

OBJECT DETECTION button 210: Enable object detection.

LOOP button 212: Repeat a step or sequence of steps.

TRANSMIT button 218: Send the code from the programming device 200 to the programmable robot 100.

CLEAR button 214: Clear all previously programmed steps and start a new program.

SOUND button 216: Toggle between 3 sound settings: High, Low, and Off.

In other embodiments, the programming device 200 may include fewer or more buttons than described above. For example, in some embodiments, the programming device 200 may not include a dedicated TRANSMIT button 218. Rather, the programming device 200 may be configured to transmit code to the programmable robot 100 in response to a different triggering action. For example, the programming device 200 may be configured to transmit code in response to a user input from a different button, a predetermined delay after the user inputs the code, or a voice command.

In a CODE mode (described below) of the programmable robot 100, each arrow button 202, 204, 206 and 208 (FORWARD, TURN LEFT, TURN RIGHT, AND REVERSE) that the user presses on the programming device 200 represents a step in the code (or program) for the programmable robot 100. For example, to make the programmable robot 100 move forward one (1) step, the user can press the FORWARD button 202 on the programming device 200, then press the TRANSMIT button 218. The programmable robot 100 will then move forward 1 step. Each forward and reverse step may correspond to a predetermined distance of travel for the programmable robot 100. For example, the programmable robot 100 may be preconfigured to move forward (or backward) approximately 8 inches, depending on the surface, for each FORWARD (or REVERSE) step.

Figure 1:
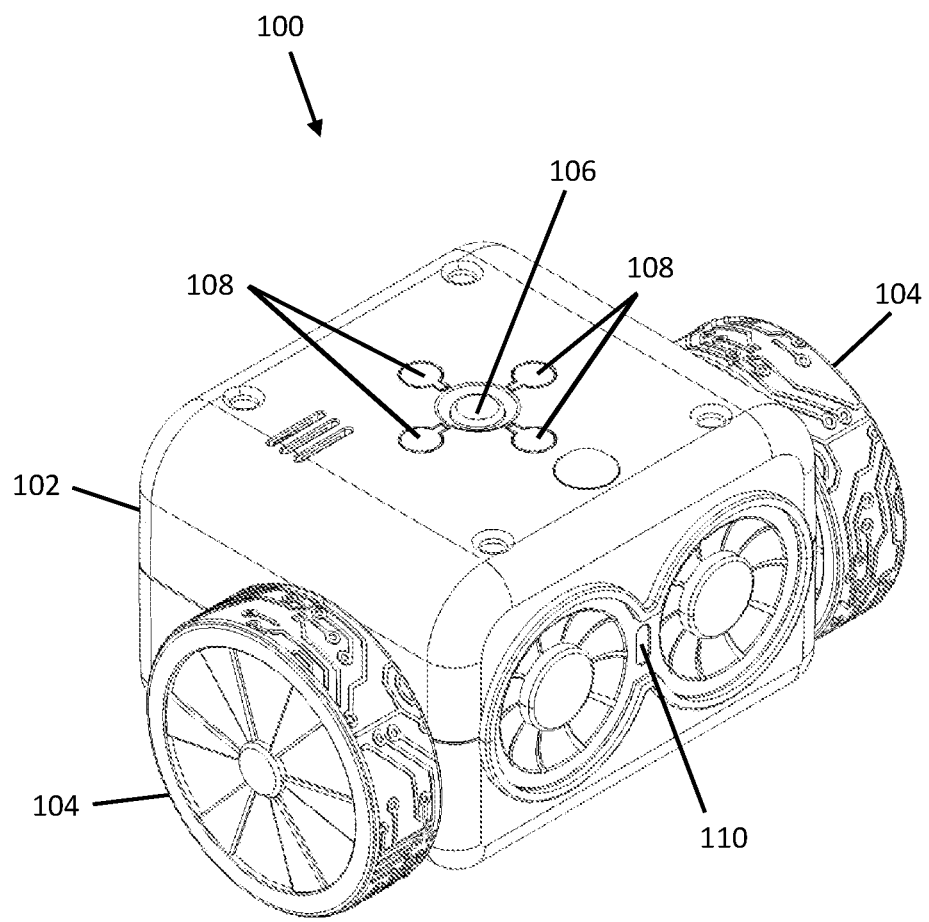
FIG. 1 shows a perspective view of a programmable toy robot in accordance with an embodiment of the present disclosure.
Figure 2:
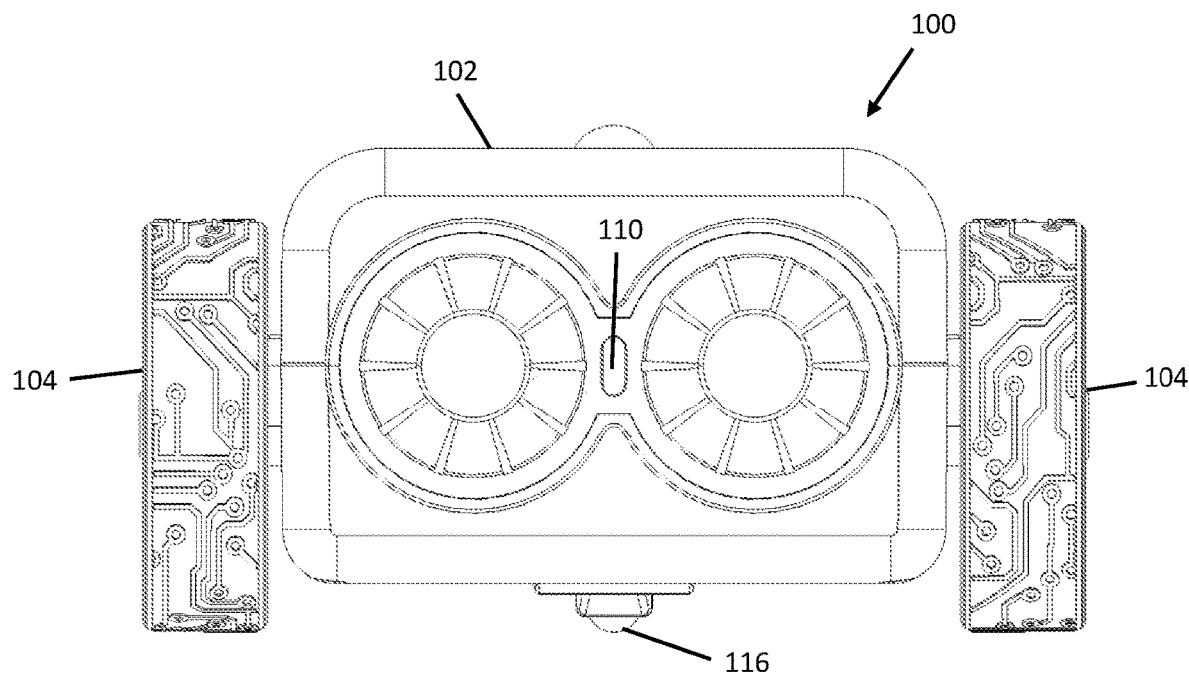
FIG. 2 shows a front elevational view of the programmable toy robot of FIG. 1.
Figure 3:
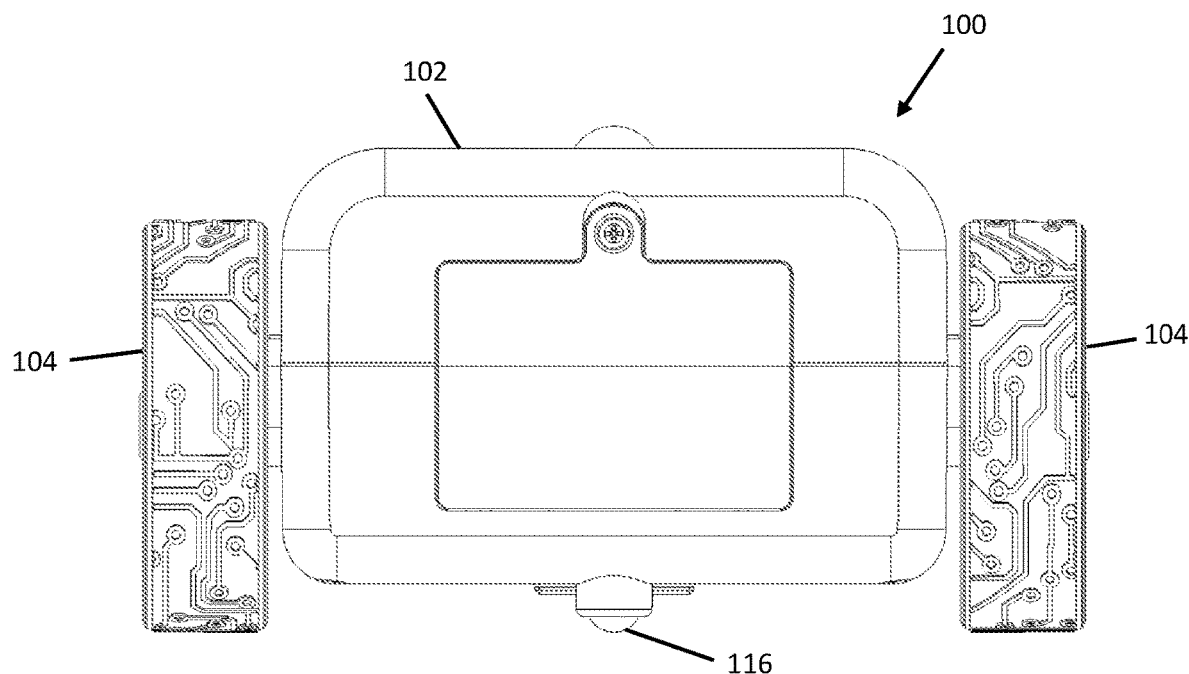
FIG. 3 shows a rear elevational view of the programmable toy robot of FIG. 1.
Figure 4:
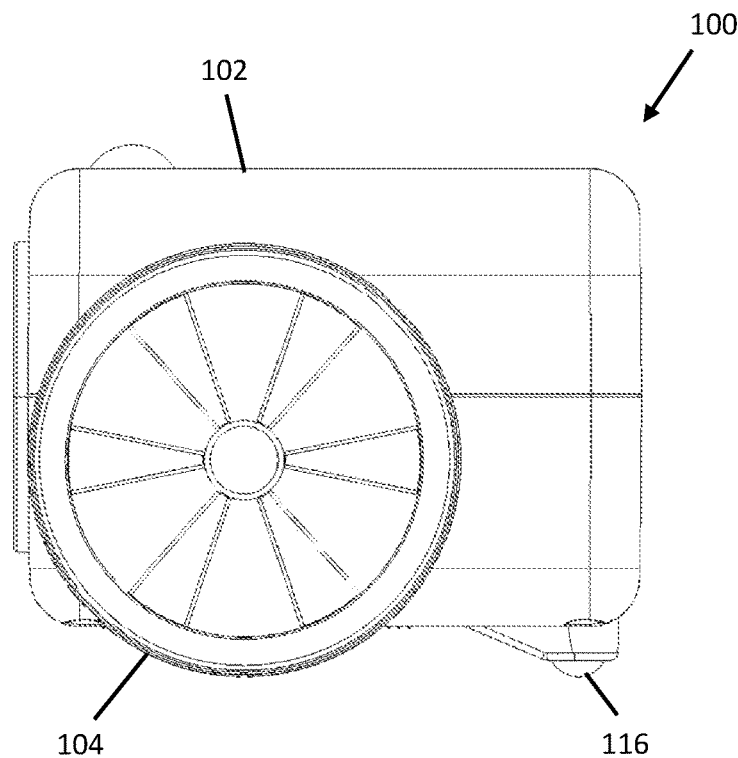
FIG. 4 shows a right side elevational view of the programmable toy robot of FIG. 1.
Figure 5:
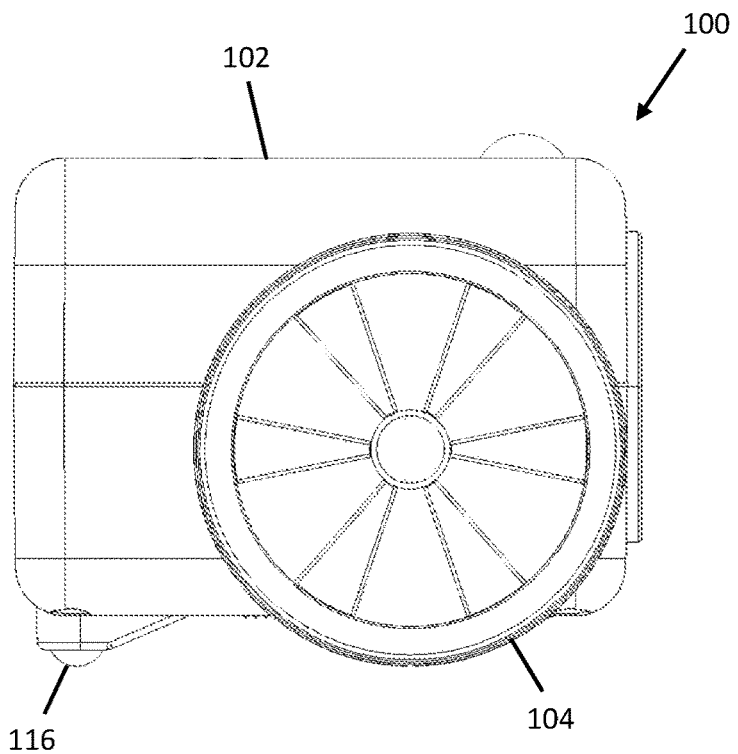
FIG. 5 shows a left side elevational view of the programmable toy robot of FIG. 1.
Figure 6:
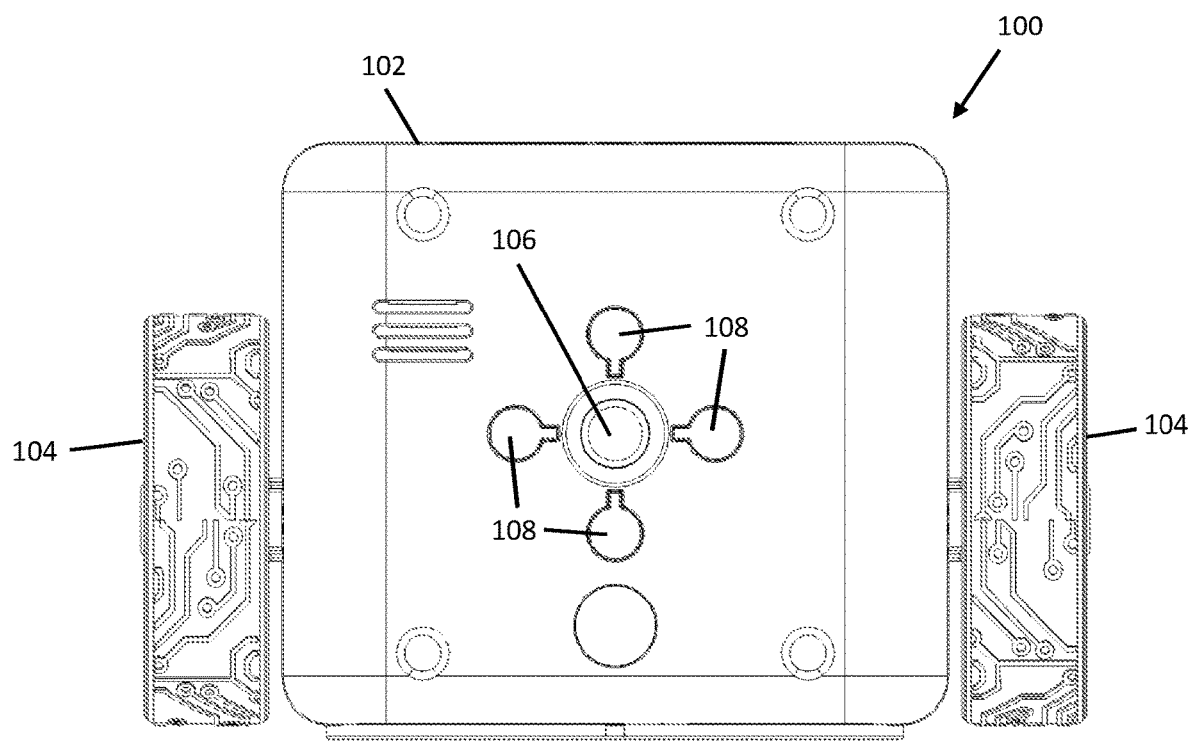
FIG. 6 shows a top plan view of the programmable toy robot of FIG. 1.
Figure 7:
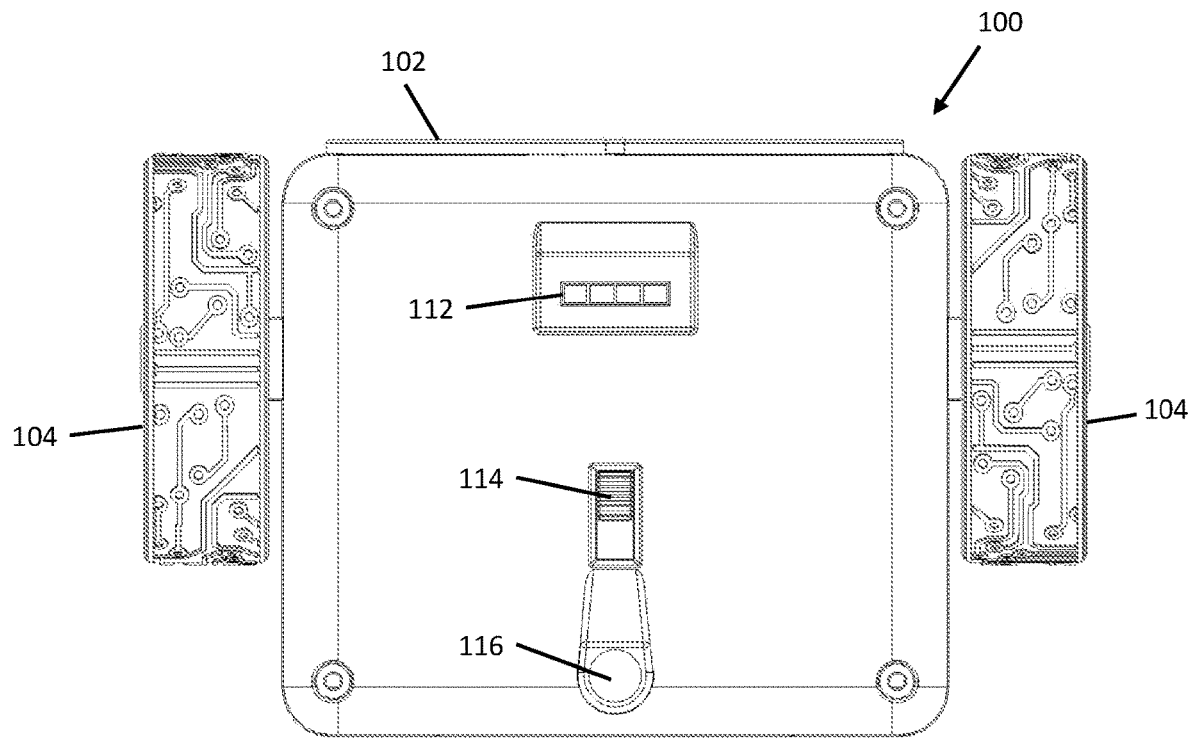
FIG. 7 shows a bottom plan view of the programmable toy robot of FIG. 1.

The user can also enter a series of commands on the programming device 200, for example, by pressing a plurality of arrow buttons 202, 204, 206 and 208 (FORWARD, TURN LEFT, TURN RIGHT, AND REVERSE) in succession, and then press the TRANSMIT button 218. As explained above, each command entered by the user represents a step in the program or code that the programmable robot 100 will execute. When the user presses the TRANSMIT button 218 to transmit the program created by entering commands on the programming device 200, the programmable robot 100 will execute all the steps in the program in order. As shown in FIGS. 1 and 6, the programmable robot 100 may include one or more visual indicators 108, for example LED lights, disposed on its top surface. The LED lights 108 on the top of the programmable robot 100 will light up at the beginning of each step. Each light 108 corresponds to one of the arrow buttons 202, 204, 206 and 208 on the programming device 200 and may have the same color as the corresponding arrow button, such that the lights 108 will light up to show the direction of each step taken by the robot 100. The programmable robot 100 will stop and make a sound when he completes the program. In some embodiments, the programming device 200 can retain a program even if the programmable robot 100 is turned off, and the user can press the CLEAR button 214 to start a new program.

Figure 11:
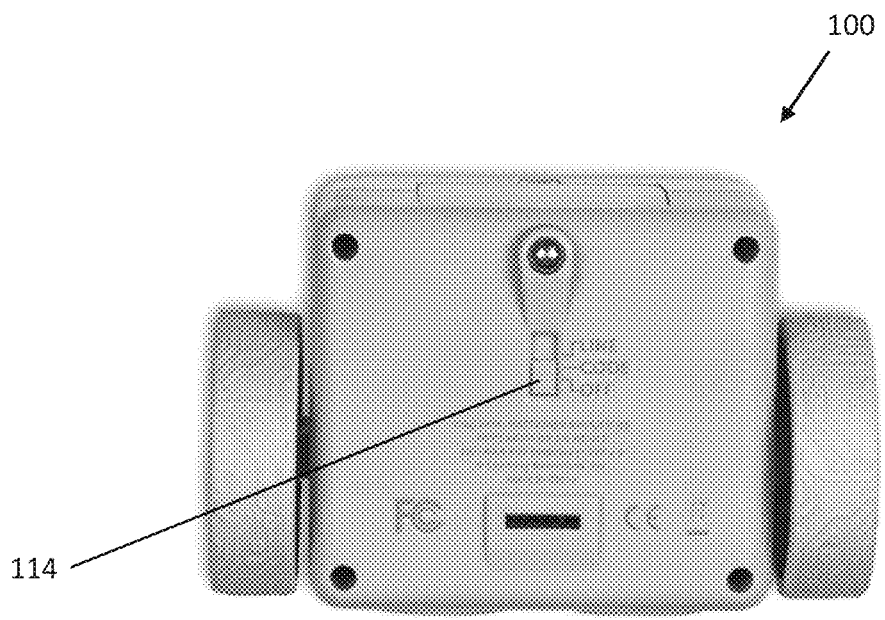
FIG. 11 shows the power switch located on the programmable toy robot of FIG. 1.
Figure 12:
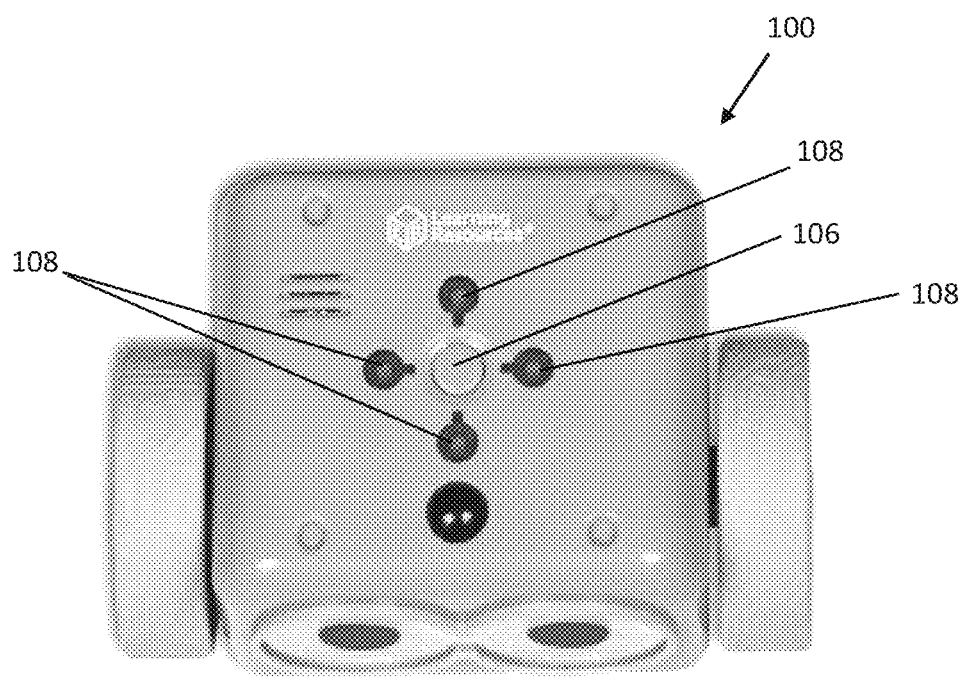
FIG. 12 shows the stop button located on the programmable toy robot of FIG. 1.

Referring to FIGS. 11 and 12, a POWER switch 114 and a center or stop button 106 are provided, respectively, on the bottom side and the top side of the programmable robot 100.

If the user wishes to stop the programmable robot 100 from moving at any time, the user can press the stop button 106 located on top of the programmable robot 100. The programmable robot 100 will power down if left idle for 5 minutes. A user can also press the stop button 106 disposed on top of the programmable robot 100 to wake it up.

According to an exemplary embodiment, a user may program the programmable robot 100 by performing the following actions:

1. Slide the POWER switch 114 on the bottom of the programmable robot 100 to CODE.
2. Place the programmable robot 100 on the floor (he works best on hard surfaces).
3. Press the FORWARD arrow or button 202 on the programming device 200.
4. Point the programming device 200 at the programmable robot 100 and press the TRANSMIT button 218.

In response, the programmable robot 100 will light up, make a sound to indicate the program has been transmitted, and move forward one step. In some embodiments, the user may transmit a program from up to 10 feet away depending on the lighting (the programmable robot 100 works best in ordinary room lighting).

In some embodiments, the programmable robot 100 may generate a warning sound after the transmit button is pressed. In response to the warning sound, the user may perform the following actions:

Press the TRANSMIT button 218 again. (The user is not required to re-enter the program—it will remain in the programming device 200 memory until the user clears it.)

Check that the POWER button 114 on the bottom of the programmable robot 100 is in the CODE position.

Check the lighting of the surroundings. Bright light can affect the way the programming device 200 works.

Point the programming device 200 directly at the programmable robot 100.

Bring the programming device 200 closer to the programmable robot 100.

According to an exemplary embodiment, a user may program the programmable robot 100 by performing the following actions in CODE mode using the programming device 200:

1. Press the CLEAR button to 214 delete the old program.
2. Enter the following sequence using one or more of the arrow buttons 202, 204, 206 and 208: FORWARD, FORWARD, RIGHT, RIGHT, FORWARD.
3. Press the TRANSMIT button 218 and the programmable robot 100 will execute the program.

The user can also add steps onto a program. Once the programmable robot 100 completes a program, additional steps may be added by entering them into the programming device 200. When the user presses the TRANSMIT button 218, the programmable robot 100 will restart the program from the beginning, adding on the additional steps at the end. In addition, the user can STOP the programmable robot 100 at any time by pressing the stop button 106 disposed on the top surface of the robot.

In some embodiment, the programmable robot 100 can perform sequences of up to a predetermined number of maximum steps, for example, 80 steps. If the user enters a programmed sequence that exceeds the maximum number of allowed steps, the programmable robot 100 will generate a sound indicating the step limit has been reached.

Loops

Professional programmers and coders try to work as efficiently as possible. One way to do this is by using the LOOPS button 212 to repeat a sequence of steps. Performing a task in the fewest steps possible is a great way to make the code for the programmable robot 100 more efficient. Every time the user presses the LOOP button 212, the programmable robot 100 will repeat that sequence.

According to an exemplary embodiment, a user may program the programmable robot 100 with a loop program by performing the following actions in CODE mode using the programming device 200:
1. Press the CLEAR button 214 to delete the old program.
2. Press the LOOP button 212, the TURN RIGHT button 206, the TURN RIGHT button 206, RIGHT, the TURN RIGHT button 206, and the LOOP button 212 again (to repeat the steps).
3. Press the TRANSMIT button 218.

The programmable robot 100 will perform two 360 degree turns, turning completely around twice.

In some embodiments, the user may add a loop in the middle of a program. For example, the user may perform the following actions to add a loop in the middle of a program:
1. Press the CLEAR button to delete the old program.
2. Enter the following sequence using one or more of the arrow buttons 202, 204, 206 and 208: FORWARD, LOOP, RIGHT, LEFT, LOOP, LOOP, REVERSE.
3. Press the TRANSMIT button 218 and the programmable robot 100 will execute the program.

The user can use LOOP as many times as desired, as long as the code does not exceed the maximum number of steps (e.g., 80 times).

Object Detection & If/Then Programming

If/Then programming is a way to teach robots how to behave in certain conditions. For example, IF it looks like rain outside, THEN we might carry an umbrella. Robots can be programmed to use sensors to interact with the world around them. More specifically, the programmable robot 100 has an object detection (OD) sensor 110 that can help it "see" objects in his path. Using this sensor is a great way to learn about If/Then programming.

According to an exemplary embodiment, a user may program the programmable robot 100 with an If/Then program by performing the following actions in CODE mode using the programming device 200:
1. Place a cone (or similar object) about 10 inches directly in front of the programmable robot 100.
2. Press the CLEAR button 214 to delete the old program.
3. Enter the following sequence using one or more of the arrow buttons 202, 204, 206 and 208: FORWARD, FORWARD, FORWARD.
4. Press the OBJECT DETECTION (OD) button 210. The programmable robot 100 will generate a sound and the red light on the programming device 200 will stay lit to indicate that the OD sensor 110 is on.
5. Next, the user may enter one or more commands specifying the actions to be performed if the programmable robot 100 "sees" an object in his path, e.g., RIGHT, FORWARD, LEFT.
6. Press the TRANSMIT button 218.

The programmable robot 100 will then begin to execute the above sequence. IF the programmable robot 100 "sees" an object in his path, THEN it will perform the alternate sequence. It will then finish the original sequence.

In some embodiments, the OD sensor 110 may be located on the face of the robot 100 between his eyes and may detect objects that are directly in front of the robot 100 and at least 2" tall by 1½" wide. If the programmable robot 100 isn't "seeing" an object in front of him, the user may check the following:

Is the POWER button 114 on the bottom of the programmable robot 100 in the CODE position?
Is the OBJECT DETECTION sensor 110 on (the red light on the programmer should be lit)?
Is the object too small?
Is the object directly in front of the programmable robot 100?
Is the lighting too bright? In some embodiments, the programmable robot 100 works best in ordinary room lighting.

In other embodiments, the programmable robot 100 will not move forward when he "sees" an object and will generate a honking sound until the object is moved out of his way.

Black Line Following

The programmable robot 100 may include a black line sensor 112, for example, a color sensor or an infrared (IR) sensor, disposed underneath the robot 100 that allows the robot 100 to follow a black line in a LINE mode. To enter the LINE mode, a user slides the POWER switch 114 on the programmable robot 100 to LINE. For example, the included boards 308 have a black line printed on one side. A user may arrange these boards in a path for the programmable robot 100 to follow. In some embodiments, it may be preferable to avoid other color or surface changes near the black line since dark pattern or color change may affect the programmable robot's movements. The boards 308 can be arranged, for example, as shown in FIG. 13. The programmable robot 100 will turn around and go back when he reaches the end of the line.

According to an exemplary embodiment, a user may program the programmable robot 100 with a black line program by performing the following actions in CODE mode using the programming device 200:
1. Slide the POWER switch 114 on the bottom of the programmable robot 100 to LINE.
2. Place the programmable robot 100 on the black line. The black line sensor 112 on the bottom of the programmable robot 100 needs to be directly over the black line.
3. Press the stop button 106 on top of the programmable robot 100 to start line following. If he just keeps spinning around, nudge him closer to the line—he'll say "Ah-ha" when he finds the line.
4. Press the stop button 106 again to stop the programmable robot 100—or just pick him up!

The programmable robot 100 can also follow a path drawn by the user. For example, the user may draw a path for the programmable robot 100 to follow using a white piece of paper and a thick black marker. Preferably, hand-drawn lines are between 4 mm and 10 mm wide and solid black against white.

Detachable Robot Arms

Figure 17:
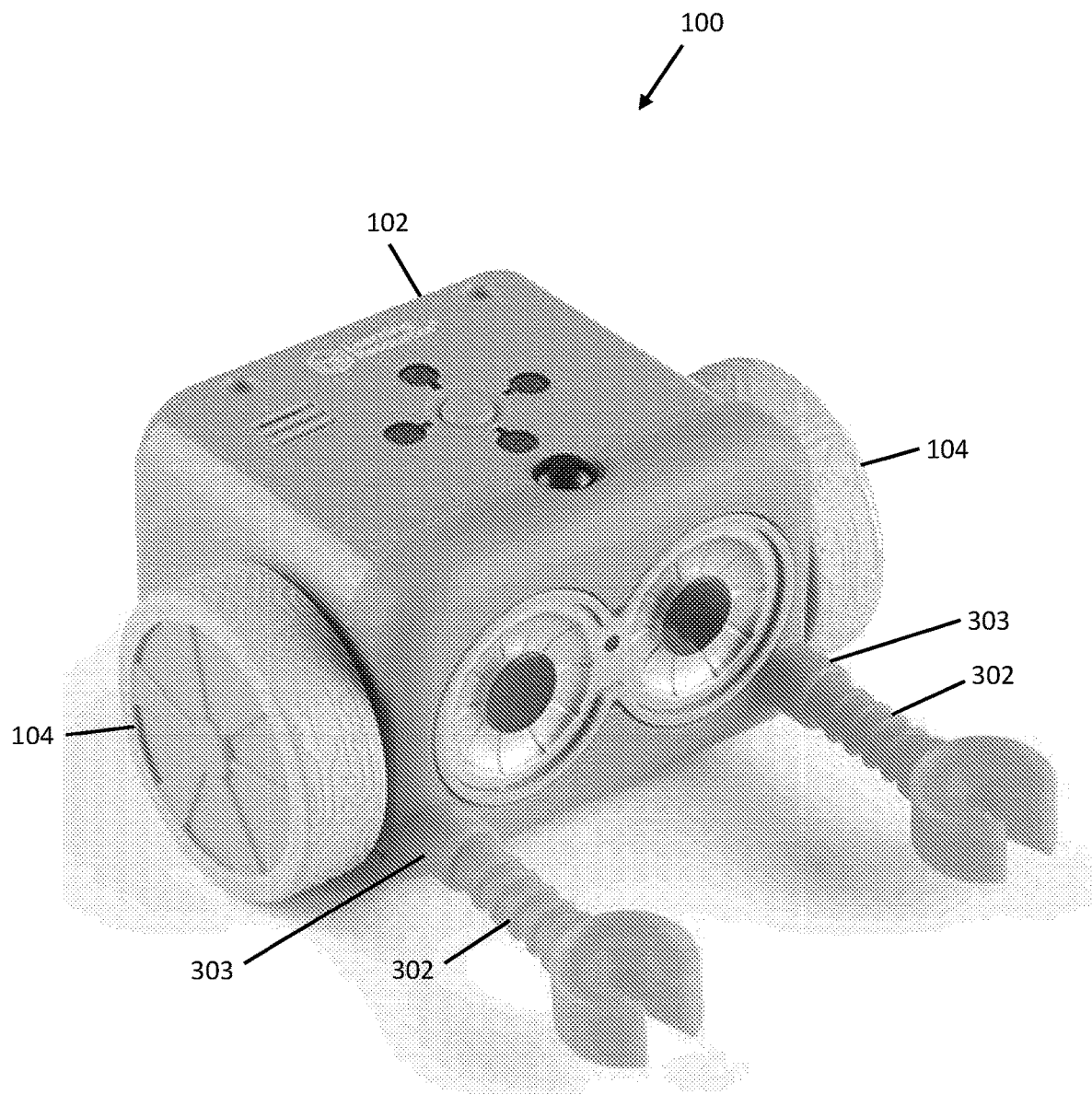
FIG. 17 shows a perspective view of a programmable toy robot having a pair of detachable arms in accordance with another embodiment of the present disclosure.

The programmable robot 100 may be equipped with detachable robot arms 304 (shown in FIGS. 9 and 17), designed to help him perform tasks. In the illustrated embodiment, a user can attach a detachable faceplate 302 onto the programmable robot's face, and insert the two removable robot arms 304 into the faceplate. The faceplate 302 is configured to couple to the front face of the programmable robot 100 in a snap-fit manner. The faceplate 302 may be formed from an opaque, translucent or transparent material that is sufficient resilient to allow the faceplate 302 to snap-fit to the programmable robot 100 without damaging the faceplate or the robot.

The faceplate 302 includes a central aperture aligned with features disposed on the front face of the programmable robot 100, for example the OD sensor 110, when the faceplate 302 is coupled to the programmable robot 100. The faceplate 302 also includes a pair of arm bosses or receptacles 303 formed on the front surface of the faceplate 302. Each arm boss 303 on the faceplate 302 is dimensioned to slidingly receive an end of a robot arm 304 in a clearance fit to hold the robot arm 304 in position. The programmable robot 100 can now move objects like the balls 318 and blocks 312. The user can set up mazes and try to build a code to direct the programmable robot 100 to move an object from one place to another. Alternatively, the robot arms 304 and hold an object. For example, the robot arms 304 can hold a pen or a paint brush to allow the programmable robot 100 to draw or paint as it travels from one place to another. When desired, the user can remove the robot arms 304 from the faceplate 302 by pulling on the robot arms 304 to disengage from the arm bosses 303. The user can also remove the faceplate 302 from the programmable robot 100 by pulling on the faceplate to disengage the snap-fit.

In other embodiments, the faceplate 302 may support fewer or more attachments in configurations different from the configuration described above using the robot arms 304. Such attachments may include, for example, an articulated claw, a hook, a net, or a magnetic arm. The faceplate 302 and/or attachments may be configured to push, grab, hold or otherwise manipulate various objects and are not limited to the components and capabilities described above and shown in FIGS. 9 and 17.

Coding Cards

A user may use the coding cards 306 (shown in FIG. 9) to keep track of each step in the code. Each card 306 features a direction or "step" to program into the programmable robot 100. These cards are color-coordinated to match the buttons on the programming device 200. The coding cards 306 may be lined up horizontally in sequence to mirror each step in the program, and to help the user follow and remember the sequence.

Easter Eggs and Hidden Features

In some embodiments, the programmable robot 100 may be configured to perform secret tricks. For example, a user may enter a predetermined sequence on the programming device 200 to make the programmable robot 100 perform secret tricks, such as a preprogrammed sequence of steps and turns.

Coding Challenges

The coding challenges 410-500 illustrated in FIGS. 14-16 are designed to get the user familiar with coding the programmable robot 100. They are numbered in order of difficulty.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

What is claimed is:

1. A programmable robot comprising:
a body including a plurality of lights;
a pair of drive wheels rotatably coupled to the body;
a pair of electric motors in the body for driving the drive wheels;
a receiver unit configured to wirelessly receive a plurality of commands, including a plurality of directional commands, from a programming device;
a sensor configured to sense a surrounding environment of the programmable robot; and
a controller operably connected to the receiver unit and the sensor, the controller configured to control operation of the electric motors in response to the plurality of directional commands received from the receiver unit and a data signal received from the sensor,
wherein the plurality of lights have characteristics coordinated with the plurality of directional commands, such that each one of the plurality of lights is configured to illuminate during execution of a corresponding one of the plurality of directional commands, the characteristics of the plurality of lights representing the respective ones of the plurality of directional commands for reinforcing a learning experience of a child in control of the programmable robot via the programming device,
wherein the body includes a power switch having a CODE position configuring the controller for user-programming of movement control via the programming device, the power switch further having a LINE position configuring the controller for black line following via the sensor.

2. The programmable robot of claim 1, wherein the plurality of commands includes a conditional command to control movement of the programmable robot in response to the data signal received from the sensor.

3. The programmable robot of claim 1, wherein each of the electric motors is configured to separately drive one of the drive wheels.

4. The programmable robot of claim 1, wherein the sensor is an object detection sensor, and wherein the object detection sensor is inactive unless programmed by the child in control of the programmable robot.

5. The programmable robot of claim 1, further comprising an arm configured to attach to the programmable robot in a snap-fit manner.

6. A system comprising:
a programmable robot including
a drive assembly configured to move the programmable robot;
a receiver unit configured to wirelessly receive commands for the drive assembly;
a sensor configured to sense a surrounding environment of the programmable robot;
a controller operably connected to the receiver unit and the sensor, the controller configured to control operation of the drive assembly in response to the commands received by the receiver unit and a data signal output from the sensor; and
a programming device configured to receive a program generated from user input, to generate the commands for the drive assembly, and to transmit the commands to the programmable robot, wherein the programming device includes an object detection button configured to selectively enable the sensor and enable at least one user-programmable conditional command responsive to the data signal from the sensor.

7. The system of claim 6, wherein the programming device includes at least one maneuvering button for generating the commands for the drive assembly, and a transmit button for transmitting the commands for the drive assembly, wherein the programming device is configured to retain the commands after transmitting.

8. The programmable robot of claim 6, wherein the drive assembly includes a pair of drive wheels, each one of the drive wheels is separately driven by a single one of a pair of electric motors.

9. The system of claim 6, wherein the programming device includes a LOOP button operable to selectively enable writing a program in the programming device to include a plurality of commands in sequence to be repeated.

10. The system of claim 6, further comprising at least one of the accessories of the group of accessories consisting of: detachable robot arms, coding cards, boards, sticks, cubes, cones, flags, and balls.

11. The system of claim 6, further comprising at least two of the accessories of the group of accessories consisting of: detachable robot arms, coding cards, boards, sticks, cubes, cones, flags, and balls.

12. The system of claim 6, further comprising a plurality of coding cards color-coordinated to match buttons on the programming device.

13. The system of claim 6, further comprising an arm configured to attach to the programmable robot in a snap-fit manner.

14. The system of claim 6, wherein the programmable robot includes a power switch having a CODE position in which the robot is responsive to the program generated from the user input, the power switch further having a LINE position configuring the controller for black line following via a black line sensor.

15. A method of teaching and learning computer programming using a programmable robot having a sensor for detecting an object relative to the programmable robot, the programmable robot configured to be programmed remotely to move along a predetermined path using a handheld button-based programming device, the remote handheld programming device including at least one maneuvering button for generating a move instruction to control movement of the programmable robot, and an object detection button for generating a conditional instruction block to control movement of the programmable robot in response to detecting the object, the method comprising:
  actuating the at least one maneuvering button of the handheld button-based programming device and repeating the step one or more times to generate a main sequence of move instructions for the programmable robot;
  actuating the object detection button of the handheld button-based programming device to generate a conditional instruction block for the programmable robot;
  actuating the at least one maneuvering button of the handheld button-based programming device directly after selecting the object detection button and repeating the step one or more times to generate an alternate sequence of move instructions for the programmable robot as part of the conditional instruction block; and
  transmitting to the programmable robot i) the main sequence of move instructions for controlling the programmable robot to perform the main sequence of move instructions and ii) the conditional instruction block including the alternate sequence of move instructions for controlling the programmable robot to perform the alternate sequence of move instructions in response to detecting the object.

16. The method of claim 15, wherein
  the at least one maneuvering button includes a forward button for generating an instruction to move the programmable robot in a forward direction relative to its orientation, a reverse button for generating an instruction to move the programmable robot in a reverse direction relative to its orientation, a right turn button for generating an instruction to rotate the programmable robot to the right relative to its orientation, and a left turn button for generating an instruction to rotate the programmable robot to the left relative to its orientation, and
  selecting the at least one maneuvering button of the handheld button-based programming device includes selecting the forward button, the reverse button, the right turn button, or the left turn button.

17. A programmable robot comprising:
  a body including a plurality of lights;
  a pair of drive wheels rotatably coupled to the body;
  a pair of electric motors in the body for driving the drive wheels;
  a receiver unit configured to wirelessly receive a plurality of commands, including a plurality of directional commands, from a programming device;
  a sensor configured to sense a surrounding environment of the programmable robot; and
  a controller operably connected to the receiver unit and the sensor, the controller configured to control operation of the electric motors in response to the plurality of directional commands received from the receiver unit and a data signal received from the sensor,
  wherein the plurality of lights have characteristics coordinated with the plurality of directional commands, such that each one of the plurality of lights is configured to illuminate during execution of a corresponding one of the plurality of directional commands, the characteristics of the plurality of lights representing the respective ones of the plurality of directional commands for reinforcing a learning experience of a child in control of the programmable robot via the programming device,
  wherein the sensor is an object detection sensor, and wherein the object detection sensor is inactive unless programmed by the child in control of the programmable robot.

18. The programmable robot of claim 17, wherein the plurality of commands includes a conditional command to control movement of the programmable robot in response to the data signal received from the sensor.

19. The programmable robot of claim 17, wherein each of the electric motors is configured to separately drive one of the drive wheels.

20. The programmable robot of claim 17, further comprising an arm configured to attach to the programmable robot in a snap-fit manner.

* * * * *